No. 738,313. PATENTED SEPT. 8, 1903.
O. P. FRITCHLE.
PROCESS OF PRODUCING ACTIVE MATERIAL AND ELECTRODES FOR
STORAGE BATTERIES AND PRODUCTS THEREOF.
APPLICATION FILED JAN. 7, 1903.

NO MODEL.

Witnesses:
R. A. Balderson
E. T. McKown

Inventor:
Oliver P. Fritchle
By Byrnes & Townsend
Att'ys.

No. 738,313.    Patented September 8, 1903.

UNITED STATES PATENT OFFICE.

OLIVER P. FRITCHLE, OF DENVER, COLORADO.

PROCESS OF PRODUCING ACTIVE MATERIAL AND ELECTRODES FOR STORAGE BATTERIES AND PRODUCTS THEREOF.

SPECIFICATION forming part of Letters Patent No. 738,313, dated September 8, 1903.

Application filed January 7, 1903. Serial No. 138,167. (No specimens.)

*To all whom it may concern:*

Be it known that I, OLIVER P. FRITCHLE, a citizen of the United States, residing at Denver, in the county of Arapahoe and State of Colorado, have invented certain new and useful Improvements in Processes of Producing Active Material and Electrodes for Lead Storage Batteries and Products Thereof, of which the following is a specification.

This invention relates to the production of a crystalline non-disintegrating active material of the utmost electrical conductivity and molecular porosity which will allow the freest possible diffusion of the electrolyte on charge and discharge. The new active material may either be compressed into a self-supporting electrode or may be carried by a suitable support or grid.

The invention is based on the discovery that finely-divided lead, especially when produced by spraying molten lead by means of a blast, obtains a peculiar cohesive property as if in a molten state when subjected to a hot dilute solution of hydrochloric acid and may be welded together into a rigid but highly-porous mass by subjecting it to light pressure. The treatment with acid causes a slight evolution of gas, which prevents the particles of lead from settling into a dense compact mass.

The process may be carried out by the use of any suitable apparatus. An apparatus which has been employed with advantage is shown in the accompanying drawings, in which—

Figure 1:
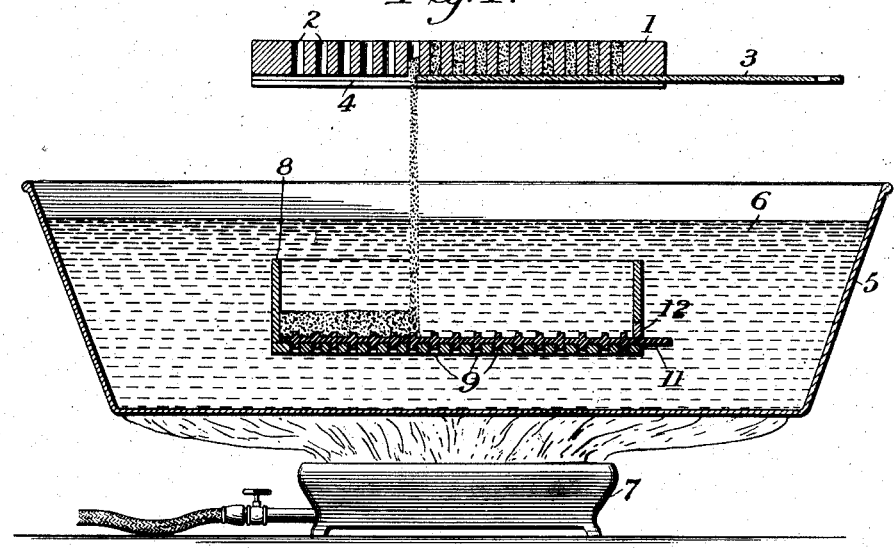
Figure 2:
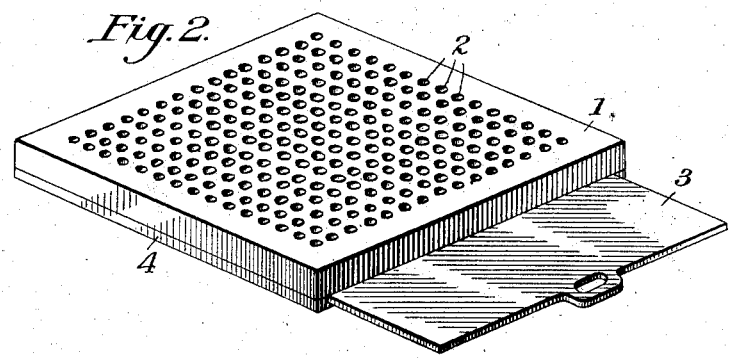
Figure 3:
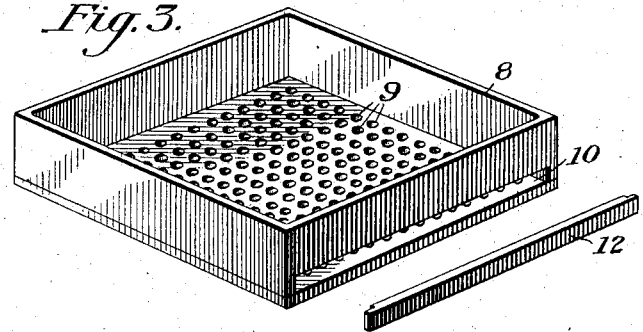

Figure 1 is a transverse vertical section of the entire apparatus. Fig. 2 is a perspective view of a device for holding the finely-divided lead and showering it evenly into the hot acid solution, and Fig. 3 is a perspective view of a device for receiving the showered lead after treatment and which is also arranged to hold a grid or other support for the treated lead.

The apparatus comprises a device 1 for holding and showering the finely-divided lead. This device is a rectangular plate, which may be of wood having a large number of perforations or slots 2 extending entirely through it. A slide 3 is arranged to move in contact with the lower surface of the plate and is supported by rabbeted parallel guide-strips 4, secured beneath the edges of the plate. A vessel 5, which may be a shallow porcelain-lined pan, contains a body of dilute hydrochloric acid 6, preferably a five-per-cent. aqueous solution. Beneath the pan is a gas-heater 7, by which the acid solution is brought to a high temperature. A receiver 8 is supported within the pan at some distance above its bottom and directly beneath the showering device 1. This receiver is a shallow rectangular tray of material which is inert toward the acid solution, such as copper. The bottom of this receiver is detachable and has a large number of perforations 9, adapted to receive projections on a grid, allowing the body of the grid to lie flat on the bottom of the receiver. A horizontal slot 10 is cut through one wall of the receiver at or slightly above the inner surface of its bottom, through which may be inserted a grid or plate 11 to receive the treated lead. A strip 12 closes the slot.

In employing this apparatus to carry out the process the receiver 8, containing the grid 11, is placed in the pan 5, and the acid solution is heated to a high temperature, preferably to its boiling-point. The apertures in plate 1 are filled with the granulated lead previously sieved to a size between sixty and one hundred mesh, the slide being closed, and the device is placed directly above the receiver 8, as shown in Fig. 1. The slide is now slowly withdrawn, and the lead falls through the hot acid solution into the receiver and onto the grid 11. The action of the acid solution on the granulated lead quickly causes it to become coherent, as if in a molten state, and the treated mass will occupy about four times the original volume of the lead. The lead is now compressed to about twice its original volume, preferably while it is still within the hot solution. It is important that the treated lead should be compressed without delay, as its property of welding is soon destroyed by the continued action of the acid. The pressure required is comparatively slight, depending upon the required porosity of the mass, and may be effected by a hand-press with screw-and-toggle mechanism. The bottom of the receiver is now detached, and the grid, with the compressed active material on one of its faces, is pushed out and again inserted with the coating of active material below. The bottom is replaced, and the other face of the grid is provided with a coating of active material by repeating the described operations.

While the use of a conducting or non-conducting grid or support is often desirable, this element is not essential. The granulated lead after passing through the acid may be received directly on the bottom of any suitable vessel and compressed into a highly-porous and self-supporting electrode of sufficient rigidity for practical use. While the process is preferably carried out by the use of the described acid solution, a solution of any other acid, salt, or compound which will yield chlorin to the lead may be substituted, or chlorin-water or chlorin itself may be employed. The use of lead which has been granulated by a blast is preferable, as the shreds and filaments interlace when the treated mass is compressed, giving the body greater firmness and rigidity. I obtain by my process an electrode possessing all the good qualities of a Planté plate with the high capacity of a Faure plate.

Heretofore most attempts at producing porous coherent active material or material to become active for storage batteries have been by combining the lead or compounds of lead with some foreign element and then dissolving out the foreign element after the electrode had been shaped, leaving the mass in a semi-adherent state easily disintegrated by the action of the current on charge and discharge.

A few attempts have been made to weld the particles of lead together by collecting them unsized when in the molten or semimolten state; but the forming of blow-holes throughout the mass cannot be avoided, while in my method it is apparent that not a single particle of the lead can be shut off from the action of the electrolyte from the fact that each particle is surrounded by gas or liquid from the beginning, and this must partially escape from the interstices of the mass upon applying the pressure in welding.

I am also aware that electrolytically-deposited crystals of lead have been compressed into a coherent mass for storage-battery electrodes; but the crystals of deposited lead are so minute, almost molecular, that after compression the interstices or pores in the compressed mass are correspondingly small, and on account of the slow diffusion of the electrolyte they soon become clogged by the insoluble sulfate, whereas in the active material formed by my process the pores are much larger, allowing a rapid circulation of the electrolyte and the washing out of any detached particles of sulfate.

The electrode produced by this process may be formed by any suitable method.

The apparatus shown and described herein is claimed in my application, Serial No. 138,168, of even date herewith.

I claim—

1. The process of producing active material for lead storage batteries, which consists in subjecting finely-divided lead to the action of chlorin and heat, as set forth.

2. The process of producing active material for lead storage batteries, which consists in subjecting finely-divided lead to the action of heat and a compound which will yield chlorin, as set forth.

3. The process of producing active material for lead storage batteries, which consists in subjecting finely-divided lead to the action of hydrochloric acid and heat, as set forth.

4. The process of producing active material for lead storage batteries, which consists in subjecting finely-divided lead to the action of dilute hydrochloric acid and heat, as set forth.

5. The process of producing active material for lead storage batteries, which consists in showering finely-divided lead into a hot, dilute solution of hydrochloric acid, as set forth.

6. The process of producing active material for lead storage batteries, which consists in subjecting finely-divided lead to the action of chlorin and heat, and then compressing the treated lead into a coherent, porous mass, as set forth.

7. The process of producing active material for lead storage batteries, which consists in subjecting finely-divided lead to the action of hydrochloric acid and heat, and then compressing the treated lead into a coherent, porous mass, as set forth.

8. The process of producing active material for lead storage batteries, which consists in showering finely-divided lead into a hot, dilute solution of hydrochloric acid, and then compressing the treated lead into a coherent, porous mass, as set forth.

9. The process of producing active material for lead storage batteries, which consists in spraying molten lead by a blast, subjecting the finely-divided lead to the action of hydrochloric acid and heat, and compressing the treated lead into a coherent, porous mass, as set forth.

10. The process of producing active material for lead storage batteries, which consists in spraying molten lead by a blast, showering the finely-divided lead into a hot, dilute solution of hydrochloric acid, and then compressing the treated lead into a coherent, porous mass, as set forth.

11. The process of producing electrodes for lead storage batteries, which consists in applying granulated lead to a support and subjecting it to the action of chlorin and heat, and then compressing the treated lead into a coherent, porous mass, as set forth.

12. The process of producing electrodes for lead storage batteries, which consists in applying granulated lead to a support and subjecting it to the action of hydrochloric acid and heat, and then compressing the treated lead into a coherent, porous mass, as set forth.

13. The process of producing electrodes for lead storage batteries, which consists in showering granulated lead through a hot, dilute solution of hydrochloric acid onto a support, and then compressing the treated lead into a coherent, porous mass, as set forth.

14. Active material for lead storage batteries, produced by subjecting finely-divided lead to the action of chlorin and heat, as set forth.

15. Active material for lead storage batteries, produced by subjecting finely-divided lead to the action of hydrochloric acid and heat, as set forth.

16. Active material for lead storage batteries, produced by showering finely-divided lead through a hot, dilute solution of hydrochloric acid, as set forth.

17. Active material for lead storage batteries, produced by subjecting granulated lead to the action of chlorin and heat and then compressing the treated lead into a coherent, porous mass, as set forth.

18. Active material for lead storage batteries, produced by subjecting granulated lead to the action of hydrochloric acid and heat and then compressing the treated lead into a coherent, porous mass, as set forth.

19. Active material for lead storage batteries, produced by showering granulated lead through a hot, dilute solution of hydrochloric acid and then compressing the treated lead into a coherent, porous mass, as set forth.

20. An electrode for lead storage batteries, comprising a support, and active material produced by subjecting granulated lead to the action of chlorin and heat and then compressing the treated lead into a coherent, porous mass, as set forth.

21. An electrode for lead storage batteries, comprising a support, and active material produced by subjecting granulated lead to the action of hydrochloric acid and heat and then compressing the treated lead into a coherent, porous mass, as set forth.

22. An electrode for lead storage batteries, produced by showering granulated lead through a hot, dilute solution of hydrochloric acid onto a support and then compressing the treated lead into a coherent, porous mass, as set forth.

In testimony whereof I affix my signature in presence of two witnesses.

OLIVER P. FRITCHLE.

Witnesses:
W. H. GOETZMAN,
SARAH STINSON.